United States Patent
Mergener et al.

(10) Patent No.: US 9,457,462 B2
(45) Date of Patent: Oct. 4, 2016

(54) POWER TOOL HAVING A SPEED SELECTOR SWITCH

(71) Applicant: Milwaukee Electric Tool Corporation, Brookfield, WI (US)

(72) Inventors: Matthew J. Mergener, Germantown, WI (US); Steven W. Hyma, Milwaukee, WI (US); Toby Lichtensteiger, Port Washington, WI (US); William E. Check, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 585 days.

(21) Appl. No.: 13/802,482

(22) Filed: Mar. 13, 2013

(65) Prior Publication Data

US 2013/0292147 A1 Nov. 7, 2013

Related U.S. Application Data

(60) Provisional application No. 61/641,754, filed on May 2, 2012.

(51) Int. Cl.
    B27F 5/02 (2006.01)
    B25F 5/00 (2006.01)
    (Continued)

(52) U.S. Cl.
    CPC .............. B25F 5/001 (2013.01); B25B 21/00 (2013.01); B27F 5/02 (2013.01); *B23Q 5/00* (2013.01); *Y10T 408/21* (2015.01)

(58) Field of Classification Search
    CPC ............ B25F 1/00; B25F 1/001; B25F 1/02; B25F 1/10; B25B 21/00; B23Q 5/00; H02P 1/18; H02P 7/29

USPC ............. 173/20, 47, 48, 176, 216, 217, 169, 173/170, 181, 183; 81/467, 470, 473; 409/135, 137, 182; 408/9, 16, 21; 73/862.193, 862.22; 318/268, 484, 490
    See application file for complete search history.

(56) References Cited

U.S. PATENT DOCUMENTS 4,410,846 A * 10/1983 Gerber .................... B23B 45/02
                                                318/490
4,412,158 A * 10/1983 Jefferson ............. H02P 23/0072
                                                318/257

(Continued)

FOREIGN PATENT DOCUMENTS

EP        1481768       12/2004
EP        1510299       3/2005

OTHER PUBLICATIONS

International Search Report and Written Opinion for Application No. PCT/US2013/039176 dated Sep. 17, 2013 (10 pages).

(Continued)

*Primary Examiner* — Scott A. Smith
(74) *Attorney, Agent, or Firm* — Michael Best & Friedrich LLP (57) ABSTRACT

A power tool includes a tool housing defining a cavity and a pocket formed in a wall of the tool housing. A motor is positioned within the cavity, and a trigger mechanism is moveably coupled to the tool housing. A speed selector switch is positioned within the pocket, the speed selector switch including a push-button operable to receive a speed selection and a plurality of speed indicators. The speed selector switch is operable to output a speed signal based on the speed selection, and the speed indicators indicate the speed selection. The power tool further includes a controller operable to receive the speed signal from the speed selector switch, the speed signal indicative of a selected speed, receive an activation signal from the trigger switch, and operate the motor at the selected speed upon receiving the activation signal.

14 Claims, 9 Drawing Sheets

(51) Int. Cl.
*B25B 21/00* (2006.01)
*B23Q 5/00* (2006.01)

(56) References Cited

U.S. PATENT DOCUMENTS

| | | | | |
|---|---|---|---|---|
| 4,454,459 A | * | 6/1984 | Huber | H02P 25/145 318/484 |
| 4,636,961 A | * | 1/1987 | Bauer | H02P 25/14 318/490 |
| 4,689,534 A | * | 8/1987 | Gerber | H01H 9/06 310/47 |
| 5,014,793 A | | 5/1991 | Germanton et al. | |
| 5,105,130 A | * | 4/1992 | Barker | B23B 45/02 318/268 |
| 5,158,354 A | * | 10/1992 | Simonin | B25B 21/00 173/164 |
| 5,277,527 A | * | 1/1994 | Yokota | B23B 45/008 192/150 |
| 5,445,479 A | * | 8/1995 | Hillinger | B25F 5/00 16/430 |
| 6,443,675 B1 | * | 9/2002 | Kopras | B25F 5/02 144/136.95 |
| 6,494,590 B1 | * | 12/2002 | Paganini | B25F 5/021 362/109 |
| 6,536,536 B1 | * | 3/2003 | Gass | B23B 31/123 173/171 |
| 6,796,921 B1 | * | 9/2004 | Buck | B25F 5/001 173/47 |
| 6,890,135 B2 | * | 5/2005 | Kopras | B25F 5/02 144/136.95 |
| 7,086,483 B2 | * | 8/2006 | Arimura | B25B 21/00 173/180 |
| 7,274,866 B2 | | 9/2007 | Rudolf et al. | |
| 7,318,485 B2 | * | 1/2008 | Greese | B25B 21/00 173/1 |
| 7,722,435 B2 | * | 5/2010 | King | B24B 23/00 451/354 |
| 7,877,841 B2 | * | 2/2011 | Mangaroo | G06K 7/10881 16/422 |
| 7,882,900 B2 | * | 2/2011 | Borinato | B23B 45/008 173/176 |
| 8,371,708 B2 | * | 2/2013 | Nagasaka | B25B 23/18 173/162.2 |
| 8,460,153 B2 | * | 6/2013 | Rudolph | B25B 21/02 475/290 |
| 8,602,125 B2 | * | 12/2013 | King | B25B 23/00 173/221 |
| 2002/0197123 A1 | | 12/2002 | Kopras et al. | |

OTHER PUBLICATIONS

Makita Industrial Power Tool, "Popular Mechanics Picks Makita Cordless Impact Driver as "Best Overall" BTD144 picked as "Best" out of nine top models", <http://www.makitausa.com/en-us/Modules/Company/PressReleases.aspx?ID=583> webpage available as early as Jul. 12, 2010.

Milwaukee Electric Tool Corporation, Service Parts List (2012) Bulletin No. 54-26-2640, 2 pages.

* cited by examiner

POWER TOOL HAVING A SPEED SELECTOR SWITCH

CROSS-REFERENCE TO RELATED APPLICATION

The present application claims priority to U.S. Provisional Application 61/641,754, filed May 2, 2012, the entire contents of which are incorporated herein by reference.

BACKGROUND

The present invention relates generally to power tools, such as power drills or impact drivers.

Power tools, such as power drills or impact drivers, have multiple operating speeds. With multi-speed tools it is necessary for the user to be able to switch the operating speed of the tool.

SUMMARY

In one embodiment, the invention provides a power tool includes a tool housing defining a cavity and a pocket formed in a wall of the tool housing. A motor is positioned within the cavity, and a trigger mechanism is moveably coupled to the tool housing. A speed selector switch is positioned within the pocket, the speed selector switch including a push-button operable to receive a speed selection and a plurality of speed indicators. The speed selector switch is operable to output a speed signal based on the speed selection, and the speed indicators indicate the speed selection. The power tool further includes a controller operable to receive the speed signal from the speed selector switch, the speed signal indicative of a selected speed, receive an activation signal from the trigger switch, and operate the motor at the selected speed upon receiving the activation signal.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
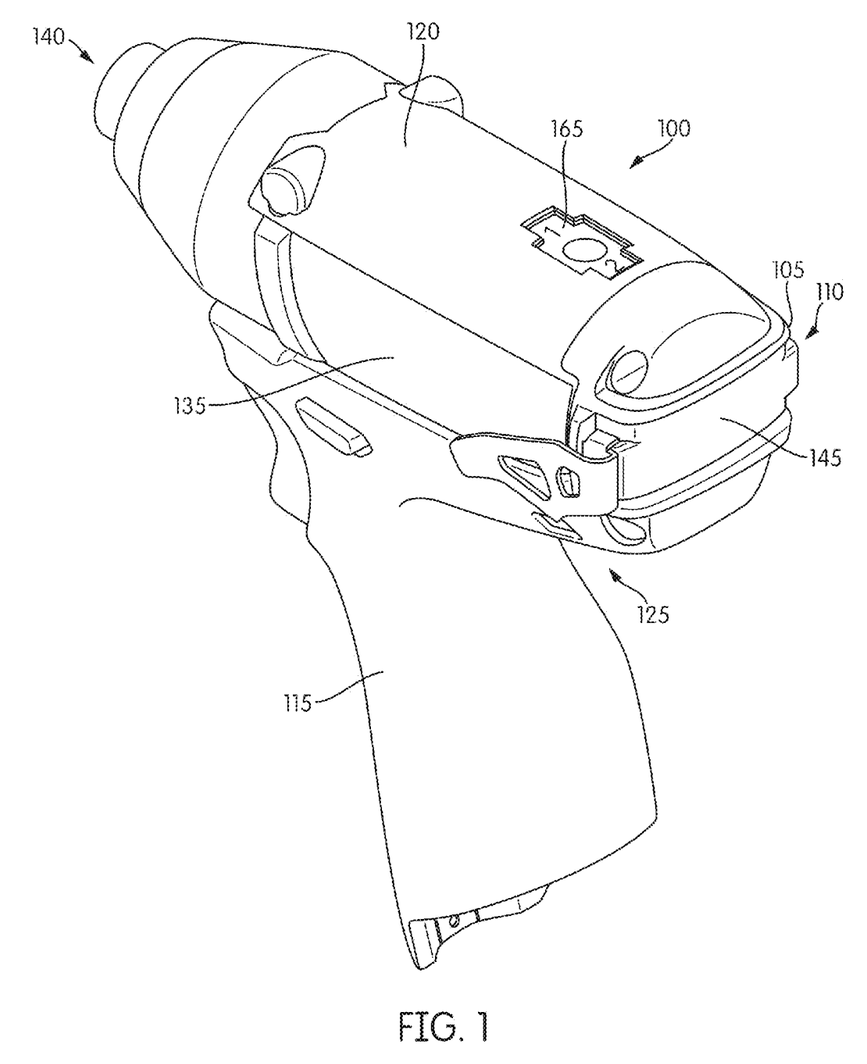
FIG. 1 is a perspective view of a tool according to one embodiment of the invention.
Figure 2:
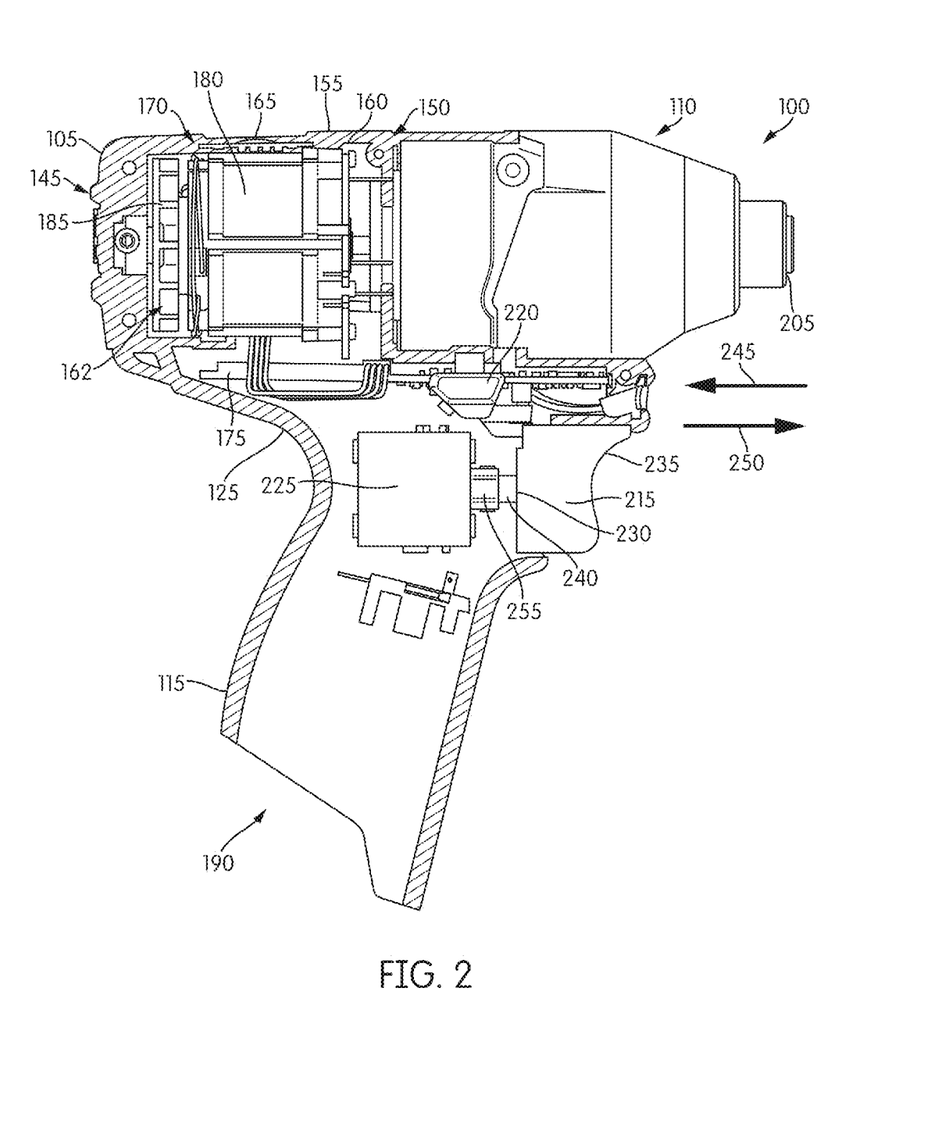
FIG. 2 is a side view of the tool shown in FIG. 1 with a portion of a tool housing removed.

FIG. 1 is a perspective view of a power tool 100 (e.g., a power drill, an impact driver, a power saw, an angle driver, etc.). The tool 100 includes a tool housing 105 defining a body portion 110 and a handle 115. The body portion 110 of the tool housing 105 includes a top surface 120, a bottom surface 125, side surfaces 130, 135, a front surface 140, and a rear surface 145. FIG. 2 illustrates the tool 100 with a portion of the tool housing 105 removed. The tool housing 105 further includes a wall 150 defining an exterior surface 155 and an interior surface 160 of the housing 105. The interior surface 160 defines a cavity 162 within the body portion 110.

A speed selector switch 165 is disposed between the exterior surface 155 and the interior surface 160 of the wall 150 and within a pocket 170 defined by the wall 150. In the illustrated embodiment, the pocket 170 is located proximate to the cavity 162, and the speed selector switch 165 is accessible from the top surface 120 of the body portion 110. In other embodiments, the speed selector switch 165 is accessible another surface of the housing, such as one of the side surfaces 130, 135 or the rear surface 145. A printed circuit board (PCB) 175 and a motor 180 are located within the cavity 162 of the body portion 110. The motor 180 is coupled to the interior surface 160 of wall 150 via a motor mount 185.

In the illustrated embodiment, the handle 115 extends downwardly from the bottom surface 125 of the body portion 110 such that the tool 100 has a pistol-style grip. A battery receptacle 190 is located at a distal end of the handle 115, and a trigger mechanism 195 is positioned on the handle 115 proximate the body portion 110.

The PCB 175 is electrically coupled to the motor 180 and includes electrical and electronic components that are operable to control the tool 100. In the illustrated embodiment, the PCB 175 includes a controller 200 (FIG. 8) for controlling operation of the tool 100.

The motor 180 is a multi-speed, brushless direct-current (BLDC) motor. As is commonly known, BLDC motors include a stator, a permanent magnet rotor, and an electronic commutator. The electronic commutator typically includes, among other things, a programmable device (e.g., a microcontroller, a digital signal processor, or a similar controller) having a processor and a memory. The programmable device of the BLDC motor uses software stored in the memory to control the electric commutator. The electric commutator then provides the appropriate electrical energy to the stator in order to rotate the permanent magnet rotor at a desired speed. In some embodiments, the controller 200 acts as the programmable device of the motor 180. In other embodiments, the programmable device is separate from the controller 200. In other embodiments of the motor 180, the motor 180 can be a variety of other types of multi-speed or variable-speed motors, including but not limited to, a brush direct-current motor, a stepper motor, a synchronous motor, an induction motor, a vector-driven motor, a switched reluctance motor, and other DC or AC motors. The motor 180 is used to drive a working element 205 (FIG. 2). In the illustrated embodiment, the working element 205 is located on the front surface 140 of the body portion 110. In the illustrated embodiment the working element 205 is a drill chuck, but other types of tools, such as angle grinders, saws, etc., will use different working elements.

The battery receptacle 190 receives a battery 210 (FIG. 8), which provides power to the tool 100. In some embodiments, the battery 210 is a rechargeable lithium-ion battery. In other embodiments, the battery 210 may have a chemistry other than lithium-ion such as, for example, nickel cadmium, nickel metal-hydride, etc. Additionally or alternatively, the battery 210 may be a non-rechargeable battery. In some embodiments, the battery 210 is a power tool battery including a pack housing containing one or more battery cells and a latching mechanism for selectively securing the battery 210 to the battery receptacle 190. In another embodiment, the battery 210 is mounted externally to the handle 115. In another embodiment, the battery 210 is mounted below the handle 115. In another embodiment, an electrical cord provides power to the tool 100.

Referring to FIGS. 2-6, the trigger mechanism 195 includes a trigger 215, a direction switch 220, and an electrical switch 225. In the illustrated embodiment, the trigger 215 extends partially down a length of the handle 115; however, in other embodiments the trigger 215 extends down the entire length of the handle 115 or may be positioned elsewhere on the tool 100. The trigger 215 is moveably coupled to the handle 115 such that the trigger 215 moves with respect to the tool housing 105. The trigger 215 includes an interior portion 230 and an exterior portion 235, which is accessible to the user. The interior portion 230 is coupled to a push rod 240, which is engageable with the electrical switch 225. The exterior portion 235 of the trigger 215 moves in a first direction 245 towards the handle 115, when the trigger 215 is depressed by the user. The exterior portion 235 moves in a second direction 250, away from the handle 115, when the trigger 215 is released by the user. When the trigger 215 is depressed by the user, the push rod 240 activates the electrical switch 225, and when the trigger 215 is released by the user, the electrical switch 225 is deactivated.

In the illustrated embodiment, the electrical switch 225 is a push-button electrical switch positioned within the handle 115. The electrical switch 225 includes a push button 255 and electrical contacts. When the push button 255 is activated, such as by the push rod 240, the electrical contacts are in a CLOSED position. When the electrical contacts are in the CLOSED position, electrical current is supplied from the battery to the motor 180, via the controller 200. When the push button 255 is not activated, the electrical contacts are in the OPEN position. When the electrical contacts are in the OPEN position, electrical current is not supplied from the battery to the motor 180. Although the electrical switch 225 is illustrated as a push-button electrical switch with contacts, other types of electrical switches may be used with the tool 100.

Figure 3:
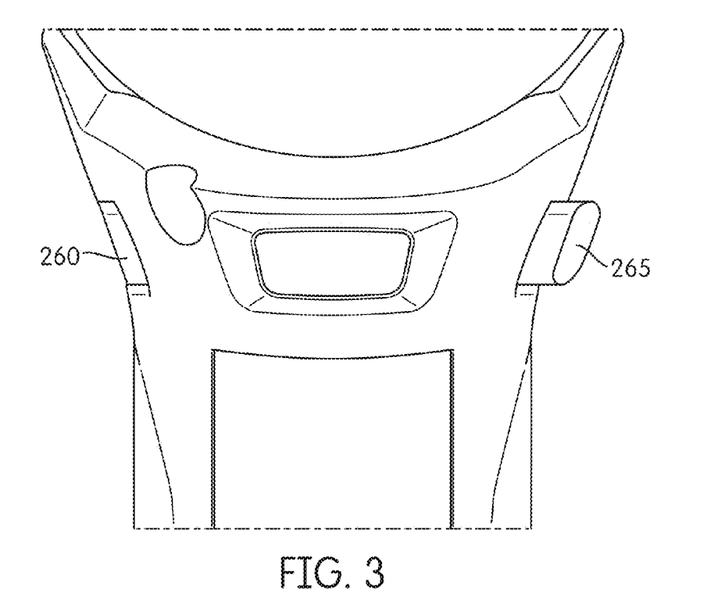
FIG. 3 illustrates a direction switch of the tool shown in FIG. 1 in a FORWARD position.
Figure 4:
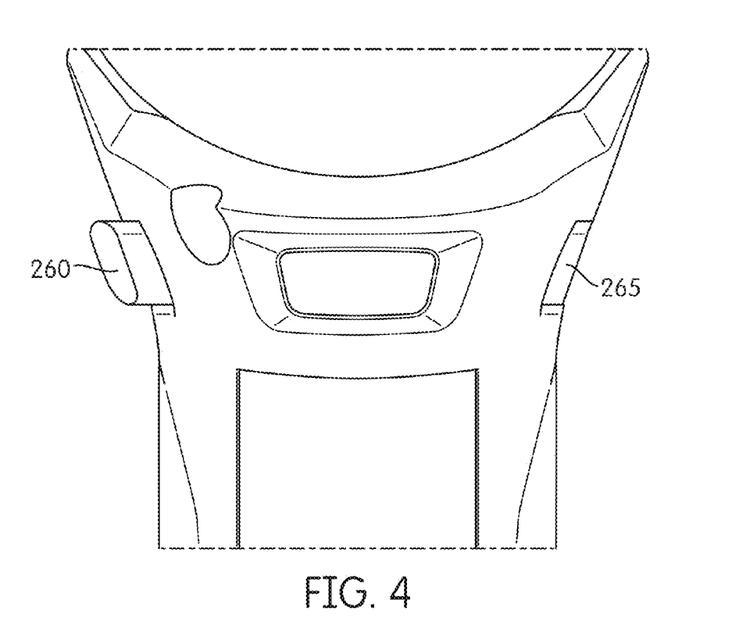
FIG. 4 illustrates the direction switch of the tool shown in FIG. 1 in a REVERSE position.
Figure 5:
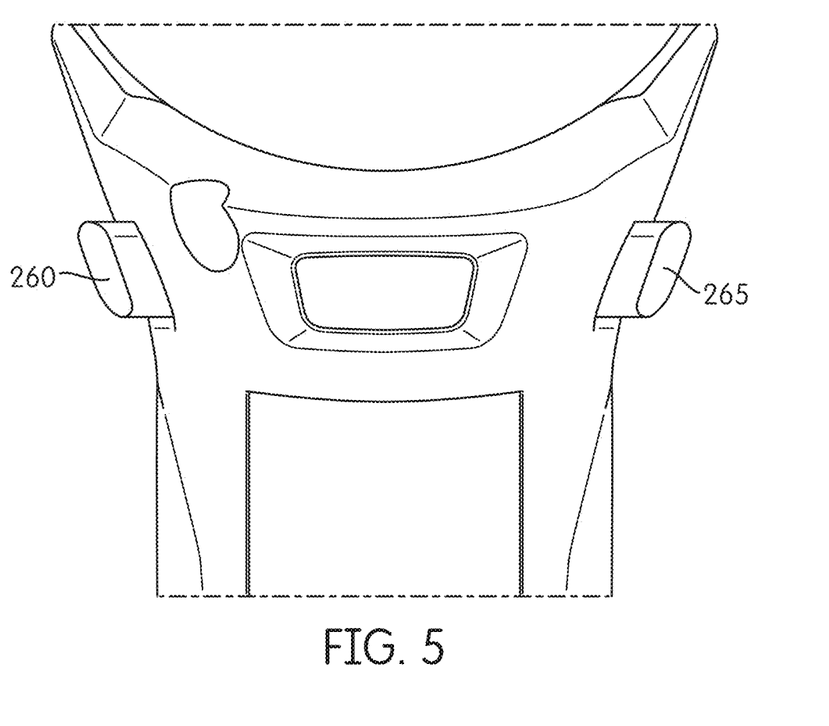
FIG. 5 illustrates the direction switch of the tool shown in FIG. 1 in a NEUTRAL position.

The direction switch 220 is located above the trigger 215 and below the body portion 110 of the tool 100. The direction switch 220 is slidingly coupled to the handle 115. As shown in FIGS. 3-5, the direction switch 220 includes a first side 260 and a second side 265. The direction switch 220 controls the directional mode of operation of the motor 180 (e.g., FORWARD, REVERSE, and NEUTRAL) by sending a signal, based on the position of the direction switch 220, to the controller 200. As shown in FIG. 3, when the first side 260 of the direction switch 220 is fully depressed, the direction switch 220 is in a first position. When the direction switch 220 is in the first position, the mode of operation for motor 180 is in the FORWARD direction. As shown in FIG. 4, when the second side 265 of the direction switch 220 is fully depressed, the direction switch 220 is in a second position, the second position being opposite the first position. When the direction switch 220 is in the second position, the mode of operation of the motor 180 is in the REVERSE direction. As shown in FIG. 5, when the direction switch 220 is in a third position, neither the first side 260 or second side 265 is fully depressed, and the mode of operation of the motor 180 is NEUTRAL.

Figure 6:
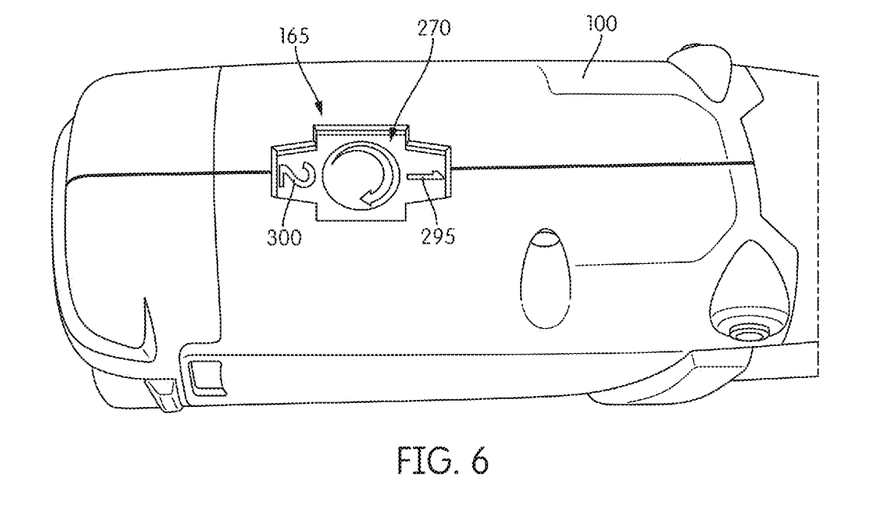
FIG. 6 illustrates a speed selector switch of the tool shown in FIG. 1.
Figure 7:
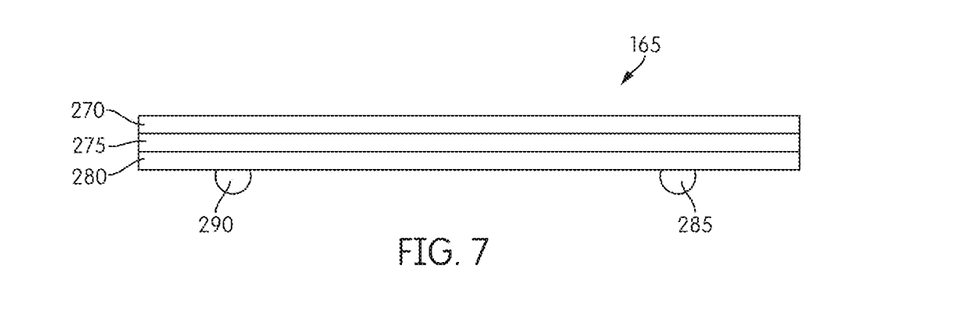
FIG. 7 illustrates a block diagram of the speed selector switch shown in FIG. 6.

As discussed above, the tool 100 includes the speed selector switch 165, as shown in more detail in FIGS. 6 and 7. The speed selector switch 165 is a multi-layer electrical switch including a label layer 270, a push-button 275, a printed circuit board layer 280, and light-emitting diodes (LEDs) 285, 290. The label layer 270 includes speed indicators 295, 300. Speed indicator 295 indicates to the operator that a first speed is selected, and speed indicator 300 indicates to the operator that a second speed is selected. The push-button 275 is an electrical push-button, and in the illustrated embodiment, the push-button 275 is a low-profile pop-switch. In some embodiments, the printed circuit board layer 280 includes a controller having a similar construction as controller 200.

In operation, the speed selector switch 165 controls the operating speed of the motor 180, via the controller 200, allowing the operator to choose between the first speed and the second speed. When the push-button 275 is pressed, the operating speed of the motor 180 is switched between the first speed and the second speed. The LEDs 285, 290 illuminate the speed indicators 295, 300, indicating to the operator the currently selected speed of the motor 180. When the first speed of the motor 180 is selected, LED light 285 is activated illuminating speed indicator 295, while LED light 290 is inactive. When the second speed of the motor 180 is selected, LED light 290 is activated illuminating speed indicator 300, while LED light 285 is inactive. Although the embodiment discussed illustrates only two speeds, it is contemplated that the tool may have three or more speeds.

Figure 8:
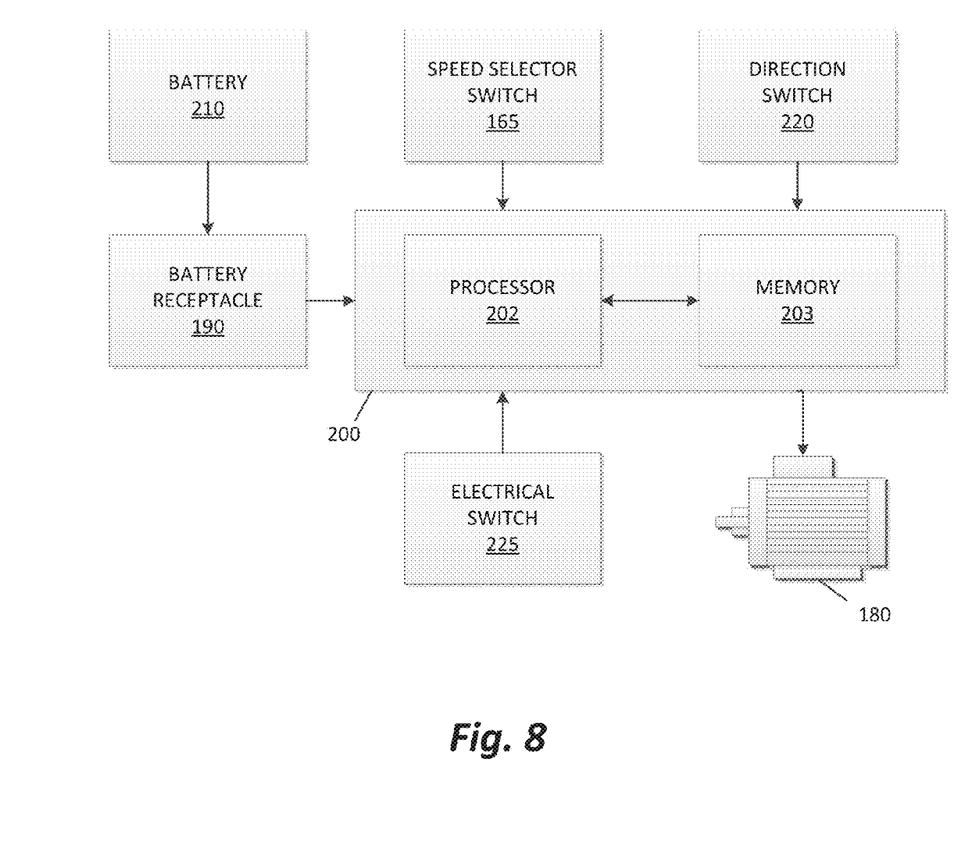
FIG. 8 is an electrical schematic diagram of the tool shown in FIG. 1, and including a controller.

FIG. 8 is an electrical schematic of the tool 100 including the controller 200. The controller 200 is electrically and/or communicatively connected to a variety of modules or components of the tool 100. For example, the controller 200 is electrically connected to the battery 210, the motor 180, the speed selector switch 165, components of the trigger mechanism 195 (i.e., the electrical switch 225 and the direction switch 220), as well as other components of the tool 100. The controller 200 includes combinations of hardware and software that are operable to, among other things, control the operation of the tool 100. In some embodiments, the controller 200 includes electrical and electronic components that provide power, operational control, and protection to the components and modules within the controller 200 and tool 100. For example, the controller 200 includes, among other things, a processor 202 (e.g., a microprocessor, a microcontroller, or another suitable programmable device) and a memory 203.

The memory 203 includes, for example, a program storage and a data storage. The program storage and the data storage can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processor 202 is connected to the memory 203 and executes software instructions that are capable of being stored in a RAM of the memory 203 (e.g., during execution), a ROM of the memory 203 (e.g., on a generally permanent basis), or another non-transitory computer readable medium such as another memory or a disc. Software included in the implementation of the tool 100 can be stored in the memory 203 of the controller 200. The software includes, for example, firmware, one or more applications, program data, filters, rules, one or more program modules, and other executable instructions. The controller 200 is configured to retrieve from memory and execute, among other things, instructions related to the control processes and method described herein. In other embodiments, the controller 200 includes additional, fewer, or different components.

The controller 200 is electrically coupled to the speed selector switch 165, the motor 180, the electrical switch 225 and the direction switch 220 of the trigger mechanism 195, and the battery 210, through the battery receptacle 190. The controller 200 receives signals from the electrical components of the tool 100 and controls operation of the tool 100 according to the received signals.

In one embodiment of operation, a user selects a first speed or a second speed using the speed selector switch 165. The speed selector switch 165 sends a first speed signal or a second speed signal to the controller 200. The user then selects a FORWARD direction, a REVERSE direction, or NEUTRAL using the direction switch 220. The direction switch 220 sends a direction signal to the controller 200. Once the user activates the trigger mechanism 195, the electrical switch 225 of the trigger mechanism 195 sends an activation signal to the controller 200. The controller operates the motor 180 upon receiving the activation signal, and the motor 180 is operated at the selected speed and selected direction.

Figure 9:
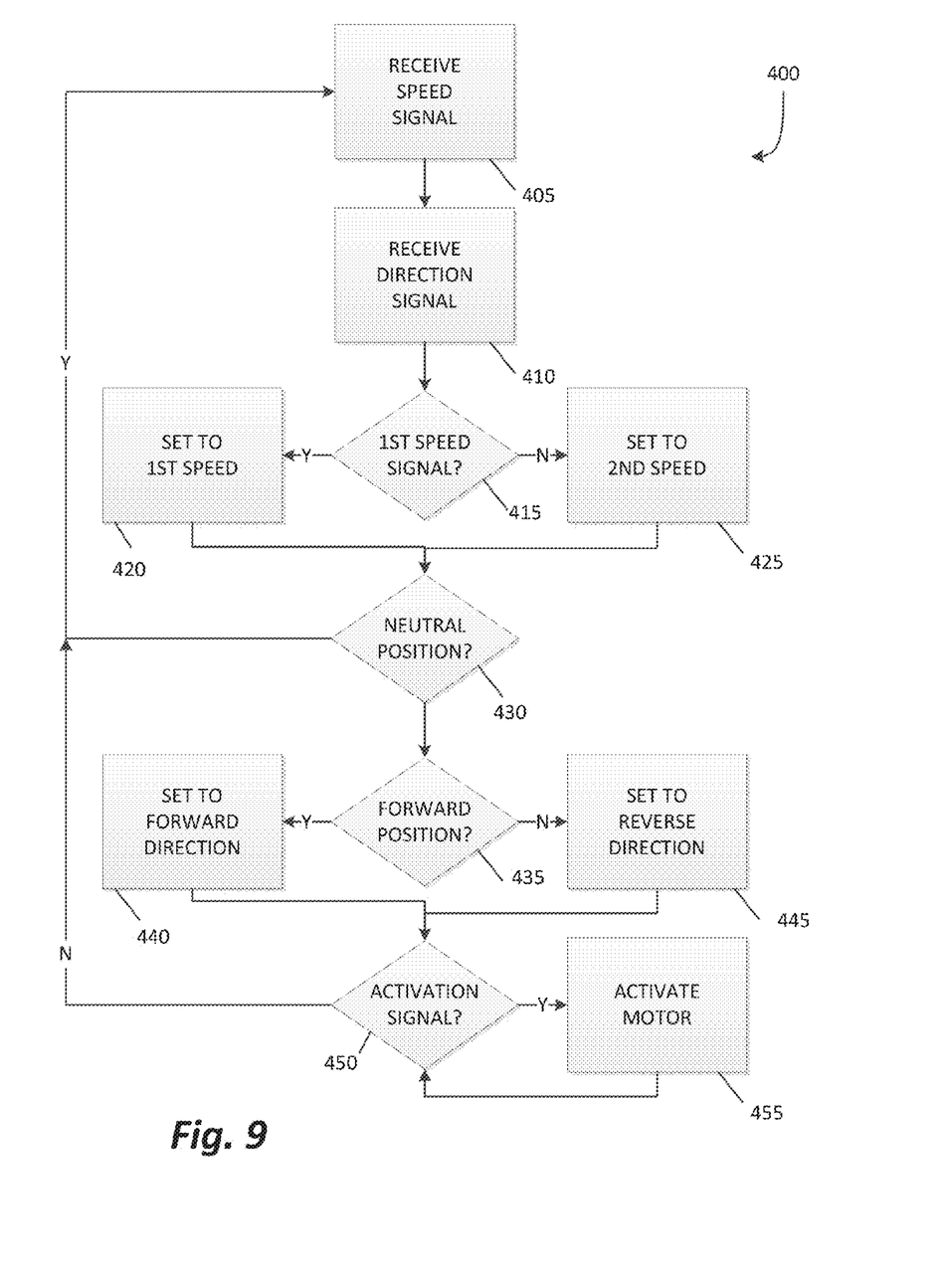
FIG. 9 is an operational schematic diagram of the tool shown in FIG. 1.

FIG. 9 illustrates an operation 400 of the controller 200. The controller 200 receives a speed signal from the speed selector switch 165 (Step 405) and a direction signal from the direction switch 220 (Step 410). The controller 200 determines if the speed signal is a first speed signal (Step 415). If the speed signal is the first speed signal, the controller 200 sets the operation speed of the motor 180 to the first speed (Step 420). If the speed signal is not the first speed signal, and thus the second speed signal, the controller 200 sets the operation speed of the motor 180 to the second speed (Step 425).

Next, the controller 200 determines if the direction switch 220 is in a neutral position, and thus the controller 200 is receiving a neutral signal (Step 430). If the direction switch 220 is in a neutral position, the operation cycles back to Step 405. If the direction switch 220 is not in the neutral position, the controller 200 determines if the direction switch 220 is in a forward position, and thus the controller 200 is receiving a forward signal (Step 435). If the controller 200 determines the direction switch 220 is in the forward position, the controller 200 sets the direction of the motor 180 to the forward position (Step 440). If the controller 200 determines the direction switch 220 is not in the forward position, and thus is in the reverse direction, the controller sets the direction of the motor 180 to the reverse position (Step 445).

Once the direction signal is determined, the controller 200 determines if the electrical switch 225 has been activated (Step 450). If the controller 200 determines that the electrical switch 225 has not been activated, the operation cycles back to Step 405. If the controller 200 determines that the electrical switch 225 has been activated, the controller 200 activates the motor 180 according to the selected speed and selected direction (Step 455). The operation then cycles back to Step 450.

Figure 10:
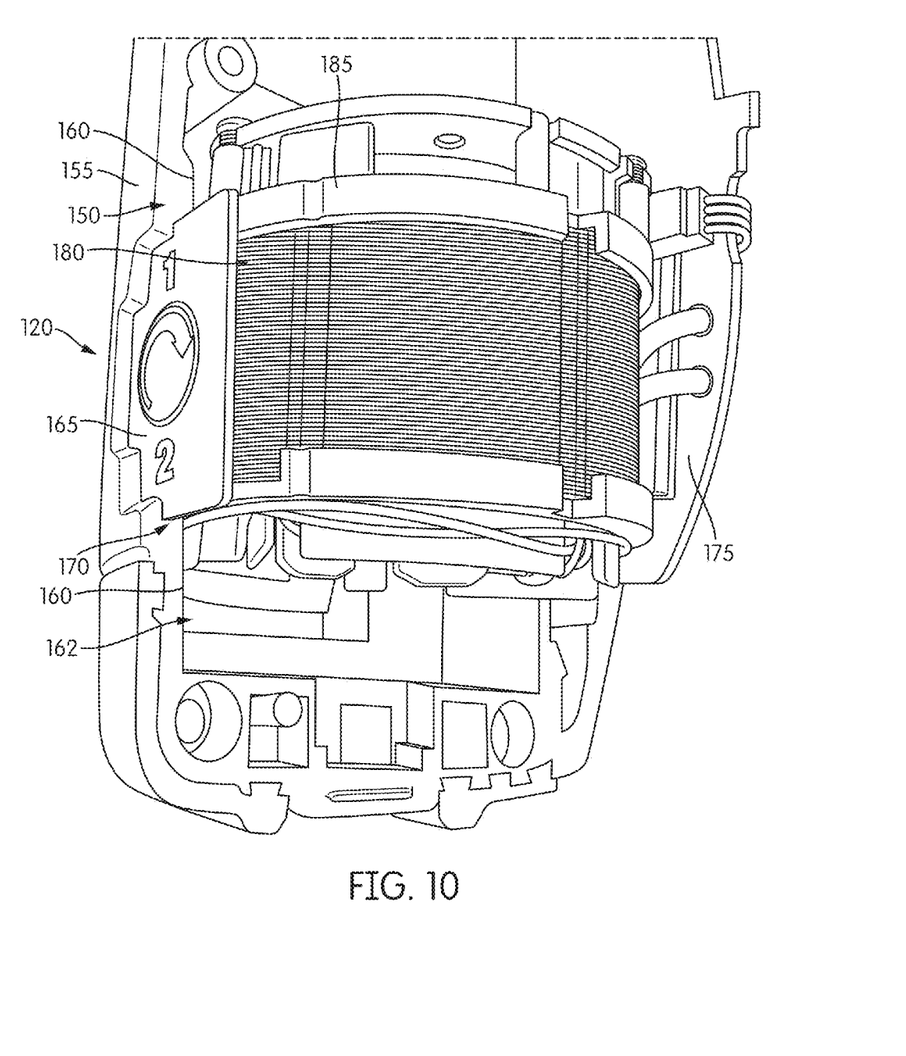
FIG. 10 is a perspective view of the tool shown in FIG. 1 with the tool housing removed.

Referring to FIG. 10, in the illustrated embodiment, the speed selector switch 165 is located within the pocket 170 proximate to the motor 180 and accessible from the top surface 120 of the body portion 110. The compact design of the speed selector switch 165 allows it to be placed in the relatively small space above the motor 180. Further, the lightweight design of the speed selector switch 165 adds little weight to the tool 100.

Figure 11:
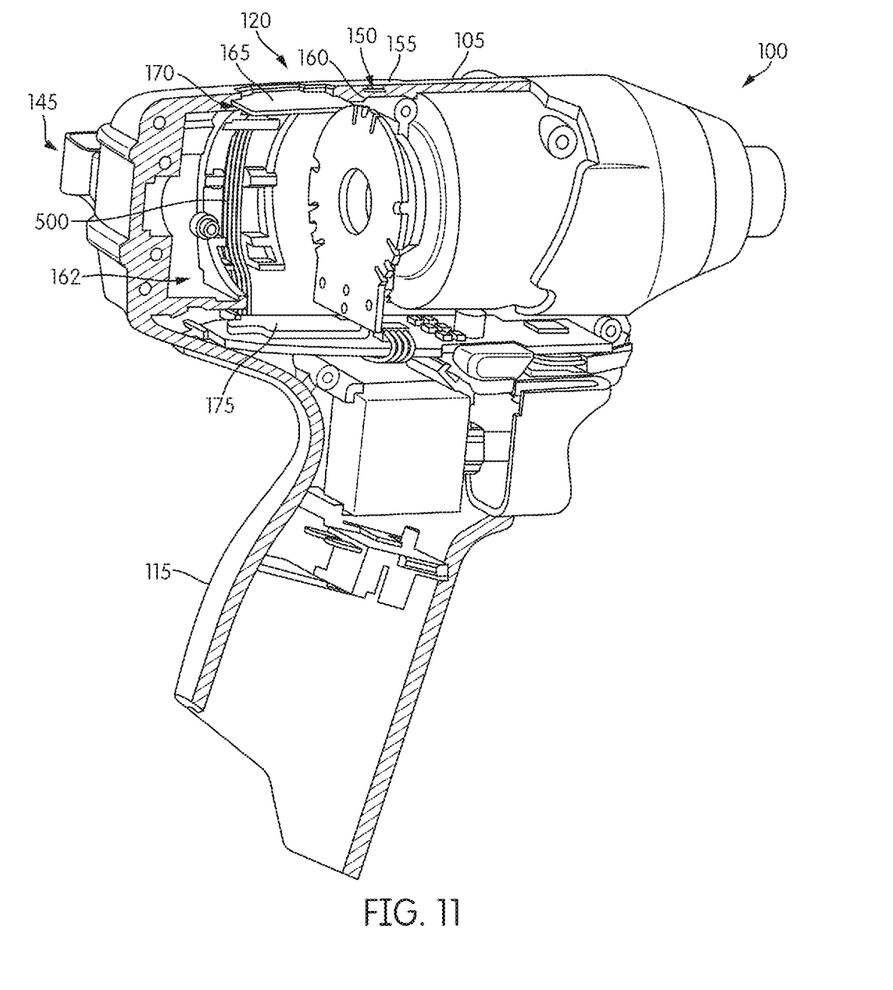
FIG. 11 is a perspective view of the tool shown in FIG. 1 with a motor and a portion of the tool housing removed.

As shown in FIG. 11, with the motor 180 removed for viewing purposes, wires 500 for the speed selector switch 165 run along a side of the interior surface 160 of wall 150 and electrically couple the speed selector switch 165 to the PCB 175.

Thus, the invention provides, among other things, a power tool including a speed selector switch for selecting an operating speed of the power tool. Various features and advantages of the invention are set forth in the following claims.

What is claimed is:

1. A power tool comprising:
    a tool housing defining a cavity;
    a motor positioned within the cavity;
    a trigger mechanism moveably coupled to the tool housing;
    a speed selector switch including a push-button, a first speed indicator located on a first side of the push-button, a second speed indicator located on an opposite, second side of the push-button, a printed circuit board layer positioned beneath the push-button, a first light emitting diode electrically coupled to the printed circuit board layer and positioned beneath the first speed indicator for illuminating the first speed indicator, and a second light-emitting diode electrically coupled to the printed circuit board layer and positioned beneath the second speed indicator for illuminating the second speed indicator;
        wherein the push-button is operable to receive a speed selection,
        wherein the speed selector switch is operable to output a speed signal based on the speed selection,
        wherein the speed indicators indicate the speed selection; and
    a controller operable to
        receive the speed signal from the speed selector switch, the speed signal indicative of a selected speed,
        receive an activation signal from the trigger mechanism, and
        operate the motor at the selected speed upon receiving the activation signal.

2. The power tool of claim 1, further comprising a motor mount coupled to an interior surface of the tool housing, wherein the motor is supported by the motor mount, and wherein the speed selector switch is positioned adjacent a circumferential periphery of the motor mount.

3. The power tool of claim 1, wherein the speed selector switch is accessible from one of a top surface of the power tool, a side surface of the power tool, and a rear surface of the power tool.

4. The power tool of claim 1, wherein the selected speed is one of a first speed and a second speed.

5. The power tool of claim 1, wherein the power tool is one of an impact driver, a power drill, an angle driver, and a power saw.

6. The power tool of claim 1, further comprising a working element drivingly coupled to the motor.

7. The power tool of claim 6, wherein the working element is a drill chuck.

8. The power tool of claim 1, further comprising a printed circuit board positioned within the cavity, wherein the speed selector switch is electrically coupled to the printed circuit board.

9. The power tool of claim 1, wherein the tool housing includes an exterior surface, an interior surface, and a pocket formed between the exterior surface and the interior surface, wherein the pocket is adjacent the cavity, and wherein at least a portion of the speed selector switch is positioned within the pocket.

10. The power tool of claim 1, wherein the first light-emitting diode is illuminated in response to the push-button being depressed a first instance, wherein the second light-emitting diode is illuminated in response to the push-button being depressed a second instance, and wherein the first light-emitting diode is deactivated in response to the push-button being depressed the second instance.

11. The power tool of claim 1, wherein the motor includes a first axial end and a second axial end opposite the first axial end, and wherein the speed selector switch is positioned between the first axial end and the second axial end.

12. The power tool of claim 1, wherein the speed selector switch is positioned to longitudinally overlap with the motor.

13. The power tool of claim 1, wherein the printed circuit board layer is positioned adjacent and radially outward from a circumferential periphery of the motor.

14. The power tool of claim 1, wherein the first speed indicator and the second speed indicator are part of a label layer, and wherein the push-button is positioned between the label layer and the printed circuit board layer.

* * * * *